United States Patent
Wang et al.

(10) Patent No.: US 9,971,462 B2
(45) Date of Patent: May 15, 2018

(54) IN-CELL TOUCH SCREEN AND A METHOD OF DRIVING THE SAME

(71) Applicant: HIMAX TECHNOLOGIES LIMITED, Tainan (TW)

(72) Inventors: Wei-Song Wang, Tainan (TW); Yaw-Guang Chang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 380 days.

(21) Appl. No.: 14/805,189

(22) Filed: Jul. 21, 2015

(65) Prior Publication Data

US 2017/0024034 A1 Jan. 26, 2017

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ....... G06F 3/044; G06F 3/0416; G06F 3/0412
See application file for complete search history.

(56) References Cited

U.S. PATENT DOCUMENTS

| 9,245,490 B1* | 1/2016 | Cho .................... G09G 3/3655 |
| 2012/0038585 A1* | 2/2012 | Kim .................... G06F 3/0412 345/174 |
| 2012/0242597 A1* | 9/2012 | Hwang ................ G06F 3/0412 345/173 |
| 2014/0049486 A1* | 2/2014 | Kim ....................... G06F 3/041 345/173 |
| 2015/0355765 A1* | 12/2015 | Fukushima ........... G06F 3/0412 345/174 |
| 2015/0372028 A1* | 12/2015 | Lee ....................... G06F 3/0412 438/50 |
| 2016/0246398 A1* | 8/2016 | Huang ..................... G06F 3/044 |
| 2016/0334916 A1* | 11/2016 | Huang ................ G02F 1/13338 |

* cited by examiner

*Primary Examiner* — Amare Mengistu
*Assistant Examiner* — Crystal A Mathews
(74) *Attorney, Agent, or Firm* — Tim Tingkang Xia, Esq.; Locke Lord LLP

(57) ABSTRACT

The present invention is directed to a method of driving an in-cell touch screen. Source lines underlying a current VCOM electrode are divided into n groups. A first voltage is applied at the current VCOM electrode in a conversion phase of each sensing period. A second voltage is applied at each group of the source lines underlying the current VCOM electrode in a manner such that no net charge being contributed to the VCOM electrode by the underlying source lines, thereby parasitic capacitors associated with the current VCOM electrode having no effect on touch sensing result.

12 Claims, 4 Drawing Sheets

IN-CELL TOUCH SCREEN AND A METHOD OF DRIVING THE SAME

BACKGROUND OF THE INVENTION

1. Field of the Invention

The present invention generally relates to a touch screen, and more particularly to an in-cell touch screen.

2. Description of Related Art

A touch screen is an input/output device that combines touch technology and display technology to enable users to directly interact with what is displayed. A capacitor-based touch panel is a commonly used touch panel that utilizes capacitive coupling effect to detect touch position. Specifically, capacitance corresponding to the touch position changes and is thus detected, when a finger touches a surface of the touch panel.

In order to produce thinner touch screens, in-cell technology has been adopted that eliminates one or more layers by building capacitors inside the display. Conventional in-cell touch screens, however, possesses substantive parasitic capacitors that form a large load, thereby affecting sensitivity of the touch screen. Accordingly, a need has arisen to propose a novel scheme for driving an in-cell touch screen with enhanced touch sensitivity.

SUMMARY OF THE INVENTION

In view of the foregoing, it is an object of the embodiment of the present invention to provide a method of driving an in-cell touch screen in a manner such that the parasitic capacitors has no effect on touch sensing result.

According to one embodiment, a touch screen has a common voltage (VCOM) layer divided into VCOM electrodes which act as sensing points in a touch sensing mode. Source lines underlying a current VCOM electrode are divided into n groups, where n is an integer greater than 1. A first voltage VA is applied at the current VCOM electrode in a conversion phase of each sensing period. For each group, a second voltage VB is applied in the conversion phase of all sensing periods except one within n continuous sensing periods. For each sensing period, the second voltage VB is applied in the conversion phase at all groups of the source line except one. The second voltage VB is approximately equal to n/(n−1)*VA.

DETAILED DESCRIPTION OF THE INVENTION

Figure 1:
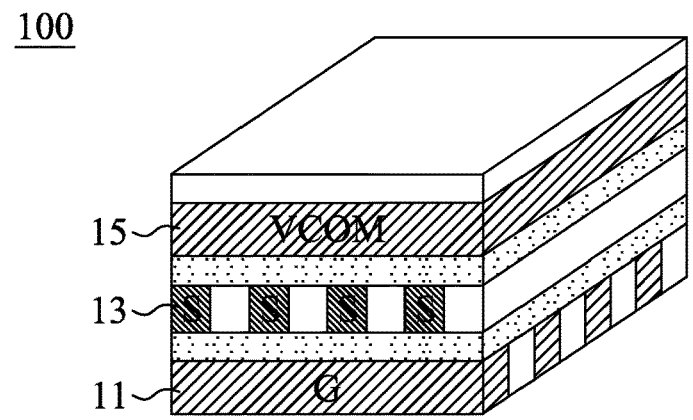
FIG. 1 schematically shows a perspective view of a capacitive in-cell touch screen according to an embodiment of the present invention.

FIG. 1 schematically shows a perspective view of a self-capacitance in-cell touch screen 100 according to an embodiment of the present invention. The self-capacitance in-cell touch screen (hereinafter touch screen) 100 primarily includes, from bottom up, gate (G) lines 11, source (S) lines 13 and a common voltage (VCOM) layer 15, which are isolated from each other. For brevity, some components of the touch screen 100 are not shown. For example, a liquid crystal layer may be disposed above the VCOM layer 15.

Figure 2:
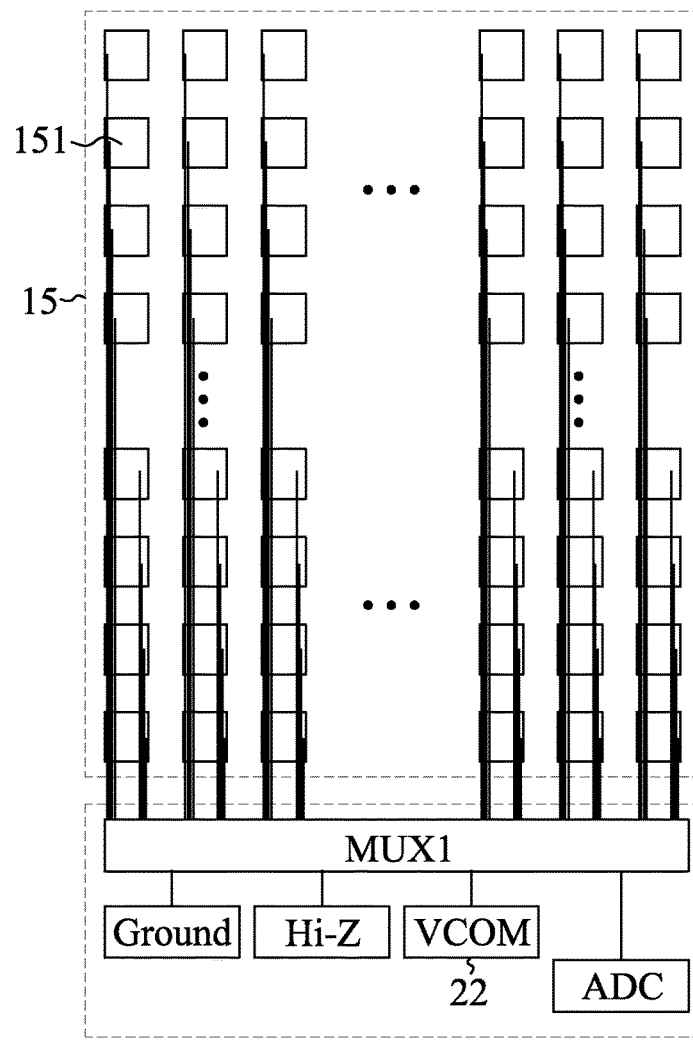
FIG. 2 shows the VCOM layer of FIG. 1.

Specifically, gate lines 11 are disposed latitudinally or in rows, and source lines 13 are disposed longitudinally or in columns. The VCOM layer 15 is divided into VCOM electrodes 151 as exemplified in FIG. 2, which act as sensing points (or receiving (RX) electrodes) in a touch sensing mode, and the VCOM electrodes 151 are connected to a common voltage, e.g., a direct-current (DC) voltage, in a display mode.

Figure 3:
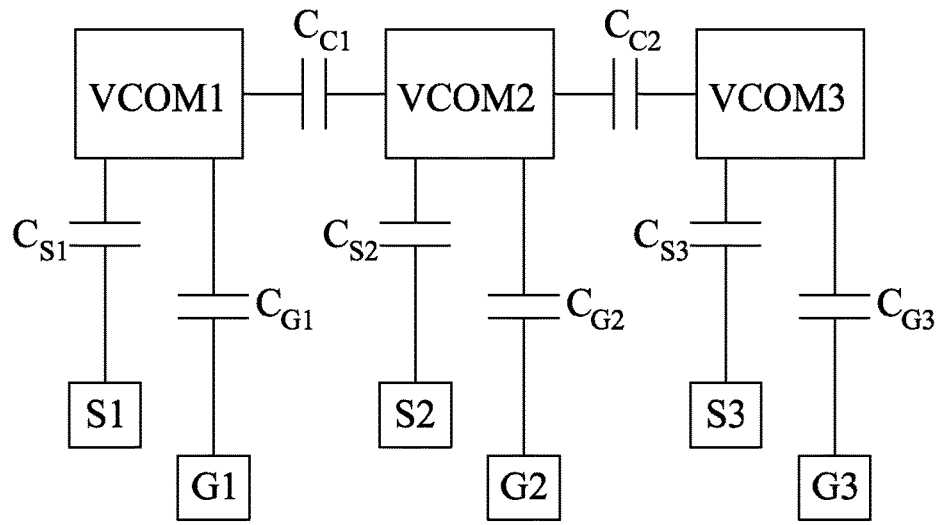
FIG. 3 shows a circuit diagram illustrating equivalent capacitors among the VCOM electrodes, the source lines and the gate lines of FIG. 1.

As the VCOM electrodes 151, the source lines 13 and the gate lines 11 are close to each other for a compact touch screen 100, parasitic capacitors are possessed by the touch screen 100. FIG. 3 shows a circuit diagram illustrating equivalent capacitors among the VCOM electrodes 151, the source lines 13 and the gate lines 11. VCOM1, VCOM2 and VCOM3 represent three adjacent VCOM electrodes 151. $C_{C1}$ and $C_{C2}$ represent equivalent capacitors between the VCOM electrodes 151. $C_{S1}$, $C_{S2}$ and $C_{S3}$ represent equivalent capacitors between the VCOM electrodes 151 (i.e., VCOM1, VCOM2 and VCOM3) and underlying source lines 13, respectively. $C_{G1}$, $C_{G2}$ and $C_{G3}$ represent equivalent capacitors between the VCOM electrodes 151 (i.e., VCOM1, VCOM2 and VCOM3) and underlying gate lines 11, respectively. Each sensing point (or VCOM electrode 151) possesses a total capacitance of $(C_{CX}+C_{SX}+C_{GX})$ (where X is 1, 2, or 3), which results in a load that affects sensitivity of the touch screen 100.

Figure 4:
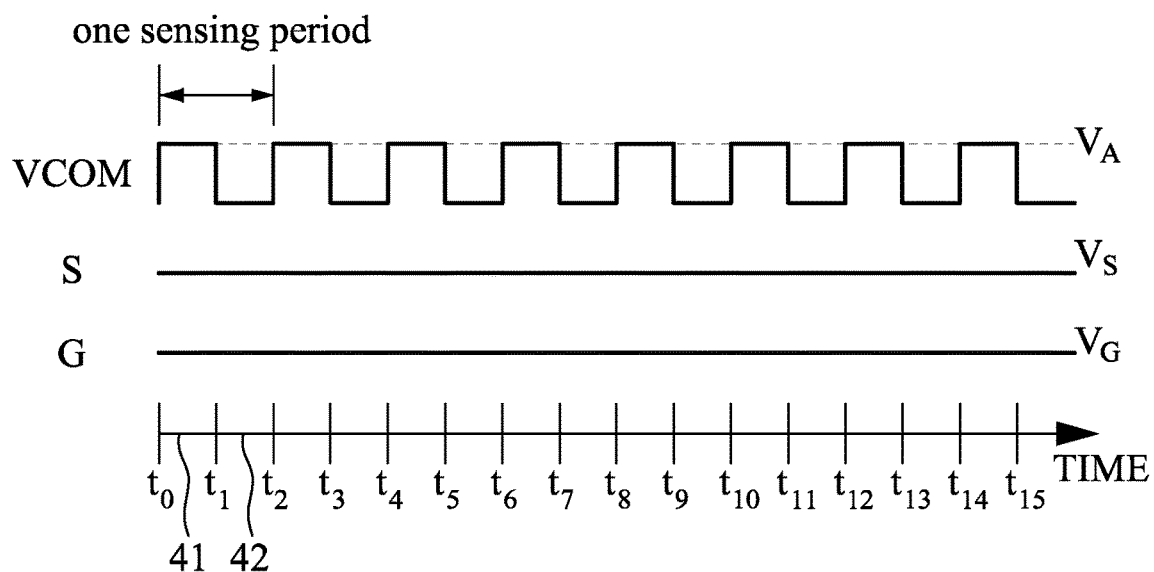
FIG. 4 shows a timing diagram illustrated of operating the touch screen of FIG. 1.

FIG. 4 shows a timing diagram illustrated of operating the touch screen 100. One sensing period is composed of a conversion phase 41 and a pre-charge phase 42. In a typical operation, a (positive) voltage $V_A$ is applied at the VCOM electrode 151 in the conversion phase 41 (for example, by a VCOM unit 22 shown in FIG. 2), and no voltage (or ground) is applied at the VCOM electrode 151 in the pre-charge phase 42. A fixed voltage $V_S$ is applied at the underlying source line 13 throughout the sensing period, and a fixed voltage $V_G$ is applied at the underlying gate line 11 throughout the sensing period. Let $C_S$ represent equivalent capacitor between the VCOM electrodes 151 and underlying source line 13, $C_G$ represent equivalent capacitor between the VCOM electrodes 151 and underlying gate line 11, $Q_S/Q_G$ is the charge contributed to the VCOM electrode 151 by the source line 13/gate line 11 during the conversion phase 41, and $Q_S'/Q_G'$ is the charge contributed to the VCOM electrode 151 by the source line 13/gate line 11 during the pre-charge phase 42:

In the conversion phase 41 (e.g., $t_0$ to $t_1$)

$$Q_S=(V_A-V_S)*C_S$$

$$Q_G=(V_A-V_G)*C_G$$

In the pre-charge phase 42 (e.g., $t_1$ to $t_2$)

$$Q_S'=(0-V_S)*C_S$$

$$Q_G'=(0-V_G)*C_G$$

In the sensing period (e.g., $t_0$ to $t_2$)

$$\Delta Q_S = Q_S - Q_S' = V_A * C_S$$

$$\Delta Q_G = Q_G - Q_G' = V_A * C_G$$

Accordingly, the source line 13 and the gate line 11 contribute charges to the VCOM electrode 151, respectively, during the sensing period, which have effect on touch sensing result. In order to alleviate the effect on touch sensing result due to the parasitic capacitors, some embodiments are thus proposed.

Figure 5A:
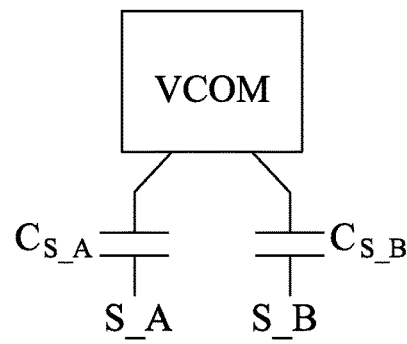
FIG. 5A shows a circuit diagram illustrating equivalent capacitors between the VCOM electrode and the source line according to a first embodiment of the present invention.
Figure 5B:
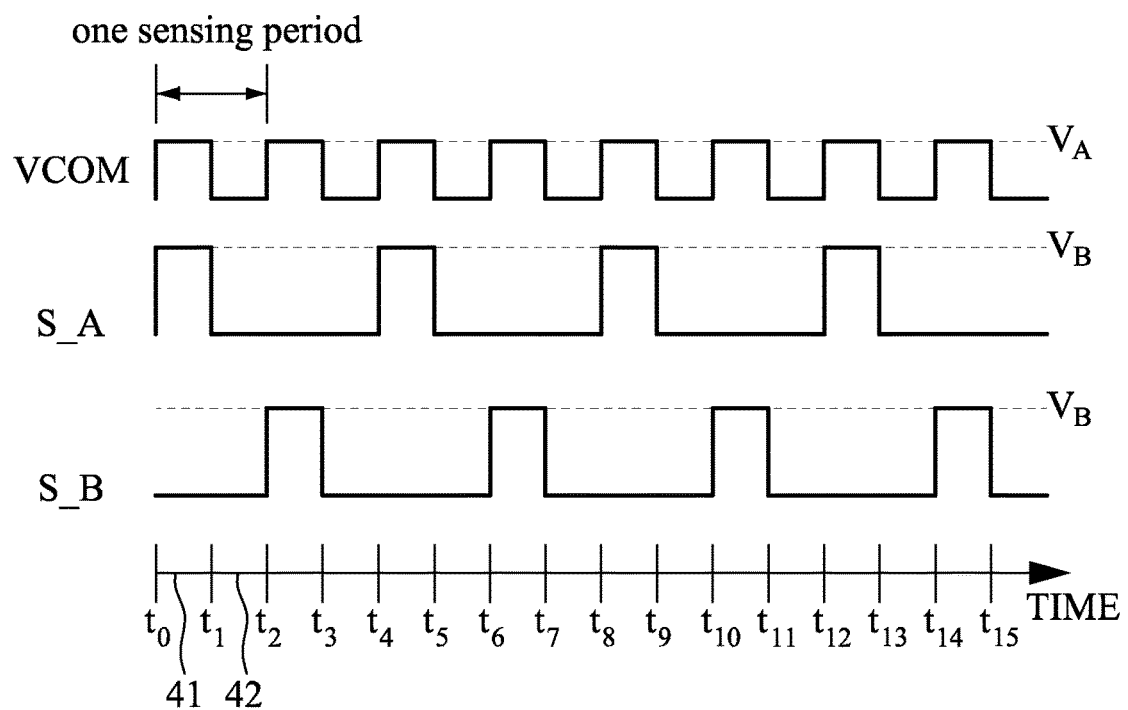
FIG. 5B shows a timing diagram illustrated of operating the touch screen associated with FIG. 5A.

FIG. 5A shows a circuit diagram illustrating equivalent capacitors between the VCOM electrode 151 (e.g., VCOM1) and the source line 13 according to a first embodiment of the present invention. FIG. 5B shows a timing diagram illustrated of operating the touch screen 100 associated with FIG. 5A.

In the embodiment, more than one source line 13 is underlying the VCOM electrode 151. The source lines 13 underlying the VCOM electrode 151 (e.g., VCOM1) are equally divided into two groups: a first-group source line S_A and a second-group source line S_B. A first equivalent capacitor $C_{S\_A}$ is between the VCOM electrode 151 and the first-group source line S_A, and a second equivalent capacitor $C_{S\_B}$ is between the VCOM electrode 151 and the second-group source line S_B. The value of the first equivalent capacitor $C_{S\_A}$ is approximately half of an (original) equivalent capacitor $C_S$, and the value of the second equivalent capacitor $C_{S\_B}$ is approximately half of an (original) equivalent capacitor $C_S$ (i.e., $C_{S\_A} = C_{S\_B} = (1/2) * C_S$).

As shown in FIG. 5B, a first voltage $V_A$ is applied at the VCOM electrode 151 in the conversion phase 41, and no voltage (or ground) is applied at the VCOM electrode 151 in the pre-charge phase 42. A second voltage $V_B$ is applied at the first-group source line S_A in the conversion phase of an even-numbered sensing period, and no voltage (or ground) is applied otherwise. The second voltage $V_B$ is applied at the second-group source line S_B in the conversion phase of an odd-numbered sensing period, and no voltage (or ground) is applied otherwise.

Let $Q_{S\_A}$ represents the charge contributed to the VCOM electrode 151 by the first-group source line S_A, and $Q_{S\_B}$ represents the charge contributed to the VCOM electrode 151 by the second-group source line S_B:

In the conversion phase 41 of the even-numbered sensing period (e.g., $t_0$ to $t_1$)

$$Q_{S\_A} = (V_A - V_B) * C_{S\_A}$$

$$Q_{S\_B} = (V_A - 0) * C_{S\_B}$$

In the pre-charge phase 42 of the even-numbered sensing period (e.g., $t_1$ to $t_2$)

$$Q_{S\_A} = (0 - 0) * C_{S\_A}$$

$$Q_{S\_B} = (0 - 0) * C_{S\_B}$$

In the whole even-numbered sensing period (e.g., $t_0$ to $t_2$)

$$\Delta Q_{S\_A} = (V_A - V_B) * C_{S\_A}$$

$$\Delta Q_{S\_B} = V_A * C_{S\_B}$$

$$\Delta Q_{S\_A} + \Delta Q_{S\_B} = (2V_A - V_B) * 0.5 * C_S$$

It is noted that, if the second voltage $V_B$ is twice the first voltage $V_A$ (i.e., $V_B = 2V_A$), no net charge is contributed to the VCOM electrode 151, and thus the parasitic capacitors has no effect on touch sensing result. The situation is similar in the odd-numbered sensing period:

In the conversion phase 41 of the odd-numbered sensing period (e.g., $t_2$ to $t_3$)

$$Q_{S\_A} = (V_A - 0) * C_{S\_A}$$

$$Q_{S\_B} = (V_A - V_B) * C_{S\_B}$$

In the pre-charge phase 42 of the odd-numbered sensing period (e.g., $t_3$ to $t_4$)

$$Q_{S\_A} = (0 - 0) * C_{S\_A}$$

$$Q_{S\_B} = (0 - 0) * C_{S\_B}$$

In the whole odd-numbered sensing period (e.g., $t_2$ to $t_4$)

$$\Delta Q_{S\_A} = (V_A - V_B) * C_{S\_A}$$

$$\Delta Q_{S\_B} = V_A * C_{S\_B}$$

$$\Delta Q_{S\_A} + \Delta Q_{S\_B} = (2V_A - V_B) * 0.5 * C_S$$

Similar to the even-numbered sensing period, if the second voltage $V_B$ is twice the first voltage $V_A$ (i.e., $V_B = 2V_A$) in the odd-numbered sensing period, no net charge is contributed to the VCOM electrode 151, and thus the parasitic capacitors has no effect on touch sensing result.

Figure 6A:
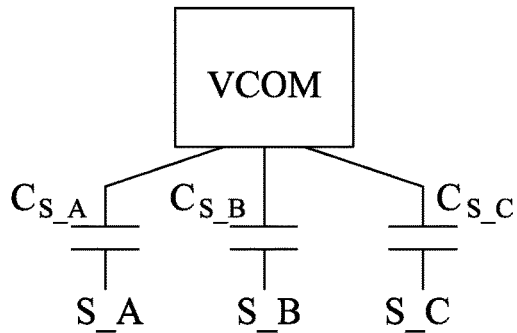
FIG. 6A shows a circuit diagram illustrating equivalent capacitors between the VCOM electrode and the source line according to a second embodiment of the present invention.
Figure 6B:
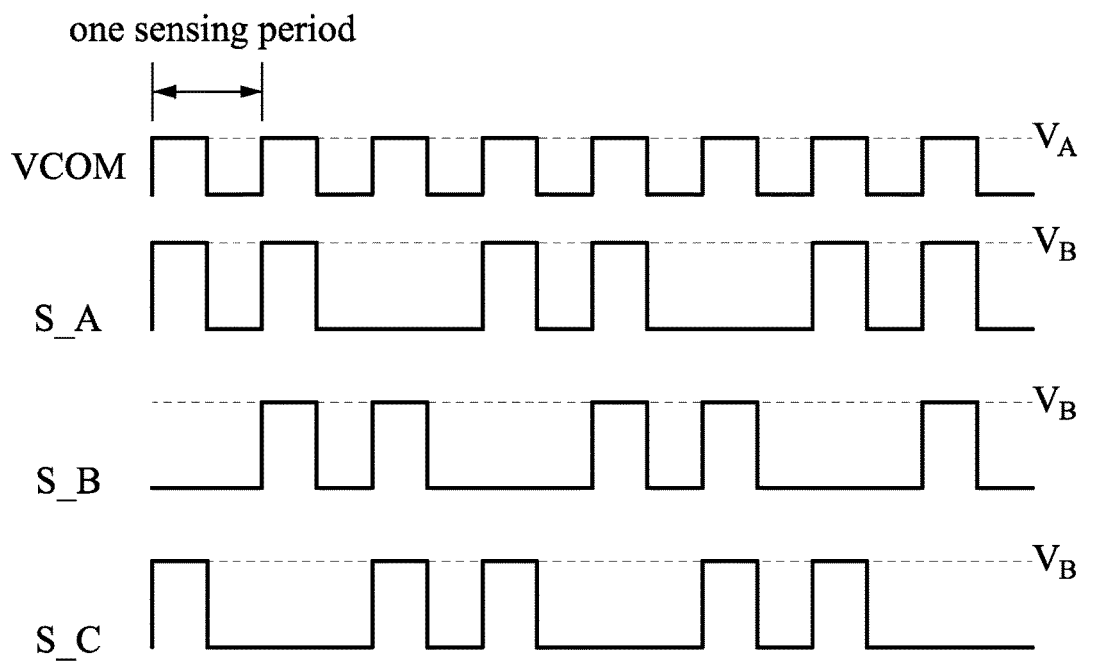
FIG. 6B shows a timing diagram illustrated of operating the touch screen associated with FIG. 6A.

FIG. 6A shows a circuit diagram illustrating equivalent capacitors between the VCOM electrode 151 (e.g., VCOM1) and the source line 13 (e.g., S1) according to a first embodiment of the present invention. FIG. 6B shows a timing diagram illustrated of operating the touch screen 100 associated with FIG. 6A.

In the embodiment, the source lines 13 underlying the VCOM electrode 151 (e.g., VCOM1) are equally divided into three groups: a first-group source line S_A, a second-group source line S_B and a third-group source line S_C. A first equivalent capacitor $C_{S\_A}$ is between the VCOM electrode 151 and the first-group source line S_A, a second equivalent capacitor $C_{S\_B}$ is between the VCOM electrode 151 and the second-group source line S_B, and a third equivalent capacitor $C_{S\_C}$ is between the VCOM electrode 151 and the third-group source line S_C. The value of the first equivalent capacitor $C_{S\_A}$ is approximately one third of an (original) equivalent capacitor $C_S$, the value of the second equivalent capacitor $C_{S\_B}$ is approximately one third of an (original) equivalent capacitor $C_S$, and value of the third equivalent capacitor $C_{S\_C}$ is approximately one third of an (original) equivalent capacitor $C_S$ (i.e., $C_{S\_A} = C_{S\_B} = C_{S\_C} = (1/3) * C_S$).

As shown in FIG. 6B, a first voltage $V_A$ is applied at the VCOM electrode 151 in the conversion phase 41, and no voltage (or ground) is applied at the VCOM electrode 151 in the pre-charge phase 42. For each group, a second voltage $V_B$ is applied in the conversion phase of all sensing periods except one within three continuous sensing periods. For each sensing period, the second voltage $V_B$ is applied in the conversion phase at all groups of the source line 13 except one.

Let $Q_{S\_A}$ represents the charge contributed to the VCOM electrode 151 by the first-group source line S_A, $Q_{S\_B}$ represents the charge contributed to the VCOM electrode 151 by the second-group source line S_B, and $Q_{S\_C}$ represents the charge contributed to the VCOM electrode 151 by the third-group source line S_C:

In the conversion phase 41 of the (3m−2)-th (m is a positive integer) sensing period (e.g., $t_0$ to $t_1$)

$$Q_{S\_A} = (V_A - V_B) * C_{S\_A}$$

$$Q_{S\_B} = (V_A - 0) * C_{S\_B}$$

$$Q_{S\_C} = (V_A - V_B) * C_{S\_C}$$

In the pre-charge phase 42 of the (3m−2)-th sensing period (e.g., $t_1$ to $t_2$)

$$Q_{S\_A}=(0-0)*C_{S\_A}$$

$$Q_{S\_B}=(0-0)*C_{S\_B}$$

$$Q_{S\_C}=(0-0)*C_{S\_C}$$

In the whole (3m−2)-th sensing period (e.g., $t_0$ to $t_2$)

$$\Delta Q_{S\_A}=(V_A-V_B)*C_{S\_A}$$

$$\Delta Q_{S\_B}=V_A*C_{S\_B}$$

$$\Delta Q_{S\_C}=(V_A-V_B)*C_{S\_C}$$

$$\Delta Q_{S\_A}+\Delta Q_{S\_B}+\Delta Q_{S\_C}=(3V_A-2V_B)*(\tfrac{1}{3})*C_S$$

It is noted that, if the second voltage $V_B$ is approximately equal to 1.5 times the first voltage $V_A$ (i.e., $V_B=1.5V_A$), no net charge is contributed to the VCOM electrode 151, and thus the parasitic capacitors has no effect on touch sensing result. The situation is similar in the (3m−1)-th sensing period:

In the conversion phase 41 of the (3m−1)-th sensing period (e.g., $t_2$ to $t_3$)

$$Q_{S\_A}=(V_A-V_B)*C_{S\_A}$$

$$Q_{S\_B}=(V_A-V_B)*C_{S\_B}$$

$$Q_{S\_C}=(V_A-0)*C_{S\_C}$$

In the pre-charge phase 42 of the (3m−1)-th sensing period (e.g., $t_3$ to $t_4$)

$$Q_{S\_A}=(0-0)*C_{S\_A}$$

$$Q_{S\_B}=(0-0)*C_{S\_B}$$

$$Q_{S\_C}=(0-0)*C_{S\_C}$$

In the whole (3m−1)-th sensing period (e.g., $t_2$ to $t_4$)

$$\Delta Q_{S\_A}=(V_A-V_B)*C_{S\_A}$$

$$\Delta Q_{S\_B}=(V_A-V_B)*C_{S\_B}$$

$$\Delta Q_{S\_C}=V_A*C_{S\_C}$$

$$\Delta Q_{S\_A}+\Delta Q_{S\_B}+\Delta Q_{S\_C}=(3V_A-2V_B)*(\tfrac{1}{3})*C_S$$

Similar to the (3m−2)-th sensing period, if the second voltage $V_B$ is approximately equal to 1.5 times the first voltage $V_A$ in the (3m−1)-th sensing period, no net charge is contributed to the VCOM electrode 151, and thus the parasitic capacitors has no effect on touch sensing result. The situation is similar in the 3m-th sensing period:

In the conversion phase 41 of the 3m-th sensing period (e.g., $t_4$ to $t_5$)

$$Q_{S\_A}=(V_A-0)*C_{S\_A}$$

$$Q_{S\_B}=(V_A-V_B)*C_{S\_B}$$

$$Q_{S\_C}=(V_A-V_B)*C_{S\_C}$$

In the pre-charge phase 42 of the 3m-th sensing period (e.g., $t_5$ to $t_6$)

$$Q_{S\_A}=(0-0)*C_{S\_A}$$

$$Q_{S\_B}=(0-0)*C_{S\_B}$$

$$Q_{S\_C}=(0-0)*C_{S\_C}$$

In the whole 3m-th sensing period (e.g., $t_4$ to $t_6$)

$$\Delta Q_{S\_A}=V_A*C_{S\_A}$$

$$\Delta Q_{S\_B}=(V_A-V_B)*C_{S\_B}$$

$$\Delta Q_{S\_C}=(V_A-V_B)*C_{S\_C}$$

$$\Delta Q_{S\_A}+\Delta Q_{S\_B}+\Delta Q_{S\_C}=(3V_A-2V_B)*(\tfrac{1}{3})*C_S$$

Similar to the (3m−1)-th sensing period, if the second voltage $V_B$ is approximately equal to 1.5 times the first voltage $V_A$ in the (3m−1)-th sensing period, no net charge is contributed to the VCOM electrode 151, and thus the parasitic capacitors has no effect on touch sensing result.

In general, the source lines 13 underlying the VCOM electrode 151 may be equally divided into n groups (n is an integer greater than 1). A first voltage $V_A$ is applied at the VCOM electrode 151 in the conversion phase 41, and no voltage (or ground) is applied at the VCOM electrode 151 in the pre-charge phase 42. For each group, a second voltage $V_B$ is applied in the conversion phase of all sensing periods except one within n continuous sensing periods. For each sensing period, the second voltage $V_B$ is applied in the conversion phase at all groups of the source line 13 except one. If the second voltage $V_B$ is approximately equal to $n/(n-1)*V_A$, no net charge is contributed to the VCOM electrode 151, and thus the parasitic capacitors has no effect on touch sensing result.

Although specific embodiments have been illustrated and described, it will be appreciated by those skilled in the art that various modifications may be made without departing from the scope of the present invention, which is intended to be limited solely by the appended claims.

What is claimed is:

1. A method of driving an in-cell touch screen, comprising:
    providing a touch screen with a common voltage (VCOM) layer divided into VCOM electrodes which act as sensing points in a touch sensing mode;
    dividing source lines underlying a current VCOM electrode into n groups, where n is an integer greater than 1;
    applying a first voltage $V_A$ at the current VCOM electrode in a conversion phase of each sensing period; and
    applying a second voltage $V_B$ at each group of the source lines underlying the current VCOM electrode in a manner such that no net charge being contributed to the VCOM electrode by the underlying source lines, thereby parasitic capacitors associated with the current VCOM electrode having no effect on touch sensing result, wherein the second voltage $V_B$ is applied in the conversion phase of all sensing periods except one within n continuous sensing periods.

2. The method of claim 1, for each sensing period, the second voltage $V_B$ is applied in the conversion phase at all groups of the source line except one.

3. The method of claim 2, wherein the second voltage $V_B$ is approximately equal to $n/(n-1)*V_A$.

4. The method of claim 1, wherein no voltage is applied at the VCOM electrode in the pre-charge phase of each sensing period.

5. The method of claim 1, wherein the in-cell touch screen comprises a self-capacitance in-cell touch screen.

6. The method of claim 1, wherein the VCOM electrodes are connected to a common voltage in a display mode.

7. An in-cell touch screen, comprising:
gate lines disposed latitudinally;
source lines disposed longitudinally; and
a common voltage (VCOM) layer divided into VCOM electrodes which act as sensing points in a touch sensing mode, and are connected to a common voltage in a display mode;
wherein source lines underlying a current VCOM electrode are divided into n groups, where n is an integer greater than 1;
a first voltage $V_A$ is applied at the current VCOM electrode in a conversion phase of each sensing period;
a second voltage $V_B$ is applied at each group of the source lines underlying the current VCOM electrode in a manner such that no net charge being contributed to the VCOM electrode by the underlying source lines, thereby parasitic capacitors associated with the current VCOM electrode having no effect on touch sensing result, and the second voltage $V_B$ is applied in the conversion phase of all sensing periods except one within n continuous sensing periods.

8. The in-cell touch screen of claim 7, wherein the gate lines, the source lines and the VCOM layer are disposed in sequence, and are electrically isolated from each other.

9. The in-cell touch screen of claim 7, wherein the in-cell touch screen comprises a self-capacitance in-cell touch screen.

10. The in-cell touch screen of claim 7, for each sensing period, the second voltage $V_B$ is applied in the conversion phase at all groups of the source line except one.

11. The in-cell touch screen of claim 10, wherein the second voltage $V_B$ is approximately equal to $n/(n-1)*V_A$.

12. The in-cell touch screen of claim 7, wherein no voltage is applied at the VCOM electrode in the pre-charge phase of each sensing period.

* * * * *